(12) United States Patent
Chen et al.

(10) Patent No.: US 7,186,191 B2
(45) Date of Patent: Mar. 6, 2007

(54) METHOD OF MAKING A GOLF CLUB HEAD HAVING A BRAZED STRIKING PLATE

(75) Inventors: Chan-Tung Chen, Kaohsiung (TW); Chun-Yung Huang, Kaohsiung Hsien (TW)

(73) Assignee: Nelson Precision Casting, Ltd., Koahsiung (TW)

( * ) Notice: Subject to any disclaimer, the term of this patent is extended or adjusted under 35 U.S.C. 154(b) by 118 days.

(21) Appl. No.: 10/849,513

(22) Filed: May 20, 2004

(65) Prior Publication Data

US 2005/0258217 A1    Nov. 24, 2005

(51) Int. Cl.
*A63B 3/04* (2006.01)
*A63B 3/08* (2006.01)
*B23K 31/02* (2006.01)

(52) U.S. Cl. ............... 473/345; 473/342; 473/329; 228/258

(58) Field of Classification Search .............. None
See application file for complete search history.

(56) References Cited

U.S. PATENT DOCUMENTS

| 1,968,092 | A  | * | 7/1934  | Oldham ............... 473/342 |
| 6,183,377 | B1 | * | 2/2001  | Liang ................ 473/324 |
| 6,299,549 | B1 | * | 10/2001 | Shieh ................ 473/342 |
| 6,319,149 | B1 | * | 11/2001 | Lee ................... 473/342 |
| 6,350,209 | B1 | * | 2/2002  | Chen .................. 473/342 |
| 6,364,789 | B1 | * | 4/2002  | Kosmatka ............. 473/329 |
| 6,669,577 | B1 | * | 12/2003 | Hocknell et al. ...... 473/329 |
| 6,749,524 | B1 | * | 6/2004  | Chen .................. 473/342 |
| 6,860,823 | B2 | * | 3/2005  | Lee ................... 473/329 |
| 6,918,841 | B2 | * | 7/2005  | Chen .................. 473/342 |
| 2003/0054901 | A1 | * | 3/2003 | Sun ................... 473/342 |
| 2004/0147341 | A1 | * | 7/2004 | Huang ................. 473/342 |
| 2005/0049074 | A1 | * | 3/2005 | Chen et al. .......... 473/334 |
| 2005/0064954 | A1 | * | 3/2005 | Chen et al. .......... 473/342 |
| 2005/0181890 | A1 | * | 8/2005 | Huang ................. 473/342 |
| 2005/0187034 | A1 | * | 8/2005 | Rice et al. .......... 473/345 |
| 2006/0019769 | A1 | * | 1/2006 | Lo .................... 473/345 |

\* cited by examiner

*Primary Examiner*—Lynne R. Edmondson
(74) *Attorney, Agent, or Firm*—Birch, Stewart, Kolasch & Birch, LLP

(57) ABSTRACT

A method of making a golf club head is disclosed. A striking plate is attached to a front open end of a metal casing to cover an opening. The striking plate is placed over the front open end by contacting a rear surface of the striking plate with the front open end, thereby creating a clearance between the rear surface and the front open end. A brazing material is positioned on one of the rear surface and the front open end externally of and immediately adjacent the clearance. When the brazing material melts, it flows into the clearance through a capillary action, thereby forming a layer of brazing material between the rear surface and the front open end.

8 Claims, 11 Drawing Sheets

METHOD OF MAKING A GOLF CLUB HEAD HAVING A BRAZED STRIKING PLATE

BACKGROUND OF THE INVENTION

1. Field of the Invention

This invention relates to a method of making a golf club head, more particularly to a method in which a striking plate is brazed to an open end of a casing of a golf club head.

2. Description of the Related Art

As more and more people like playing golf, either for pleasure or for physical exercise, the prior art have suggested various types of golf clubs to meet the increasing demand therefor. FIG. 1 shows a golf club head which includes a casing 10 and a striking panel 11. The casing 10 has an opening 12 covered by the striking panel 11 which is slightly greater than the opening. A rib 13 projects forwardly from an edge of the casing 10 which confines the opening 12 and extends around the opening 12 to engage a groove 14 which is formed in a rear surface of the striking panel 11 along the periphery of the striking panel 11. A welding layer 15 is provided between the surfaces of the striking panel 11 and the casing 10. The welding layer 15 is formed between the joint surfaces of the casing 10 and the striking panel 11 by melting a brazing material between the joint surfaces. The striking panel 11 and the casing 10 are coupled together after the brazing material is cooled.

Although the interengagement of the rib 13 and the groove 14 can increase the contact surface areas between the casing and the striking panel 11, as the brazing material is pre-arranged only at the edge of the opening 12 of the casing 10, the amount thereof is limited by the length of the edge of the opening 12. If the amount of the brazing material is insufficient, the bonding effect of the welding layer between the casing 10 and the striking panel 11 will be reduced.

During fabrication, the brazing material is placed along the edge of the opening 12 of the casing 10 before the striking panel 11 is attached to the casing 10. When the striking panel 11 is attached to the casing 10 to cause the groove 14 to engage the rib 13, the brazing material is squeezed between the groove 14 and the rib 13. When the brazing material is melted by heat, it oozes outward from the clearance between the groove 14 and the rib 13 and is solidified at the outer surfaces of the striking panel 11 and the casing 10. In order to remove the brazing material solidified at the outer surfaces, the striking panel 11 and the casing 10 must be subjected to manual or mechanical surface treating processes, such as grinding and/or polishing. The manufacturing process as such is laborious and time-consuming due to the need for surface treatment.

FIG. 2 shows another conventional golf club head which includes a metal casing 20 and a striking panel 21 as shown in FIG. 2. The casing 20 is formed with a recess 22 and a shoulder 23 to seat the striking panel 21 thereon, and the striking panel 21 is formed with a groove 24 at an outer edge thereof to engage a rib 25 formed on an inner surface of the casing 20 and extending around the opening thereof. The rib 25 is formed by softening and deforming a portion of the casing 20 adjacent the opening of the casing 20. The striking panel 21 is fixed to the casing 20 by brazing. This conventional golf club head also encounters a problem in that the brazing material oozes out and stains the outer surfaces of the casing 20 and the striking panel 21 during manufacture.

On the other hand, while the interlocking of the rib 25 and the groove 24 increases the firmness of the joint between the striking panel 21 and the casing 20, it is required that the rib 25 be formed at an accurate position so as to precisely mate with the groove 24 of the striking panel 21. Since the rib 25 is formed by heating and deforming a portion of the casing 20 proximate to the position of the groove 24 after the striking panel 21 is attached to the casing 20, once the striking panel 21 is attached, the groove 24 is covered by the casing 20 so that it is difficult to determine the exact position of the groove 24. Therefore, difficulties are encountered in processing the casing 20 to form the rib 25 at an accurate position relative to the groove 24. Unless the casing 20 is provided with a mark or measurement to indicate the position where the rib 25 is to be provided, it is impossible to form the rib 25 at an accurate position that permits the rib 25 to mate precisely with the groove 24.

Referring to FIG. 3, in a conventional method for coupling a golf club head casing and a striking plate, before the striking plate 30 is placed in a recess 32 of a casing 31, a brazing material 34 is put on a shoulder face 33 formed at the recess 32. Thereafter, the striking plate 30 is inserted into the recess 32 so that the brazing material 34 is pressed between the striking plate 30 and the shoulder face 33. When the striking plate 30 and the casing 31 are heated under vacuum, the brazing material 34 melts and fills the space between the casing 31 and the striking plate 30, thereby welding the striking plate 30 to the casing 31.

In the aforesaid method, the casing 31, the striking plate 30 and the brazing material 34 have different melting points, and the brazing material 34 which has the lowest melting point is melted to interconnect the casing 31 and the striking plate 30. However, since the brazing material 34 is in a powder form, when the brazing material 34 melts, the volume thereof contracts so that the brazing material 34 cannot fill the clearance between the joint surfaces of the casing 31 and the striking plate 30 completely. This results in voids between the joint surfaces of the striking plate 30 and the casing 31, thereby reducing the binding strength therebetween, and adversely affecting the stability of the golf club head.

In order to address the aforesaid problem arising from the contraction of the brazing material, an attempt has been made by increasing the amount of the brazing material 34. However, when the amount of the brazing material 34 is increased, the thickness of the brazing material 34 between the surfaces of the casing 31 and the striking plate 30 is increased, thereby enlarging the distance between the joint surfaces of the casing 31 and the striking plate 30. Therefore, if the amount of the brazing material 34 is increased too much, the binding strength can also be reduced. In addition, the brazing material can be wasted. It is a difficult task to balance the amount of the brazing material and the binding strength.

Furthermore, after the striking plate 30 is placed in the recess 32 and is pressed against the brazing material 34 which has been placed on the shoulder face 33 within the recess 32, even if voids are formed between the shoulder surface 33 and the striking plate 30 because of the insufficient amount of the brazing material 34, it is impossible to add the brazing material 34 to the voids by removing the striking plate 30 from the casing 31. In addition, during the manufacturing process, it is not easy to realize the presence of such voids in the products. Therefore, the aforesaid method cannot be relied upon to produce good quality products.

SUMMARY OF THE INVENTION

An object of the present invention is to provide a method of making a golf club head in which a brazing material can be introduced easily between the surfaces of a striking plate and a casing of the golf club head without staining the outer surfaces of the casing and the striking plate.

According to this invention, a method of making a golf club head, comprises: preparing a metal casing including a front open end which defines an opening; preparing a striking plate having a rear surface to be bonded to the front open end; placing the striking plate over the front open end by contacting the rear surface with the front open end, thereby creating a clearance between the rear surface and the front open end and around the opening; positioning a brazing material on one of the rear surface and the front open end externally of and immediately adjacent the clearance; and causing the brazing material to melt and to flow into the clearance through a capillary action, thereby forming a layer of the brazing material between the rear surface and the front open end.

Preferably, the brazing material is positioned by being seated against one of the rear surface and the front open end externally of the opening. The method may further comprise the step of adding the brazing material to the clearance when the amount of the brazing material in the clearance is insufficient, wherein an additional amount of the brazing material is positioned on one of the rear surface and the front open end externally of the clearance and is heated to flow into the clearance by a capillary action.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and in which.

DETAILED DESCRIPTION OF THE PREFERRED EMBODIMENTS

Figure 1:
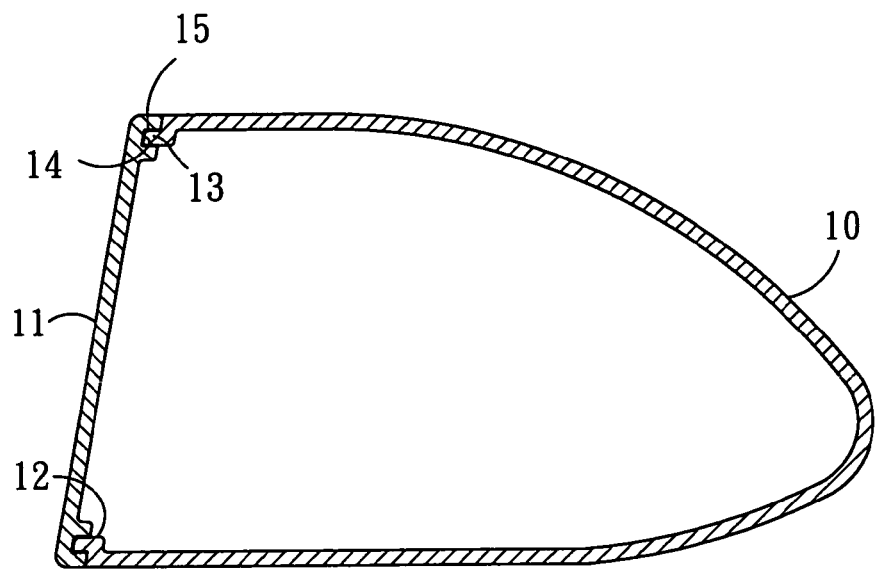
FIG. 1 is a sectional view of a conventional golf club head.
Figure 2:
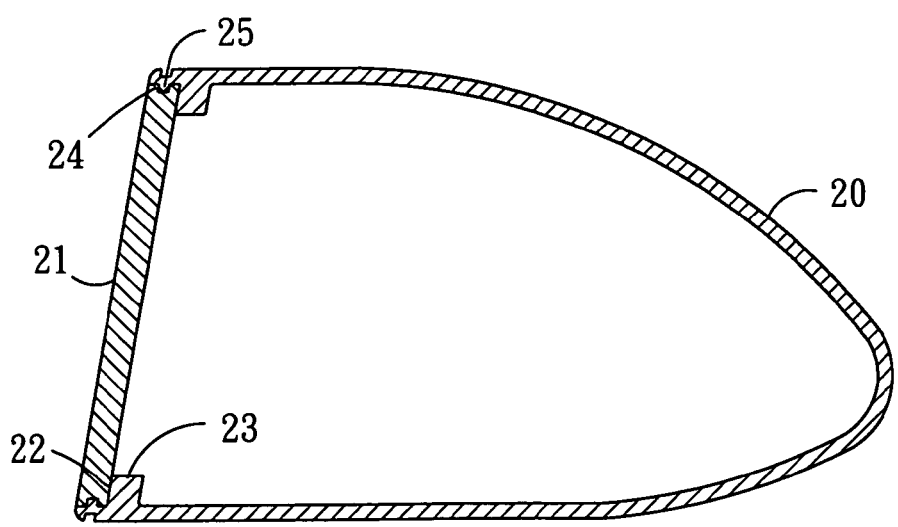
FIG. 2 is a sectional view of another conventional golf club head.
Figure 3:
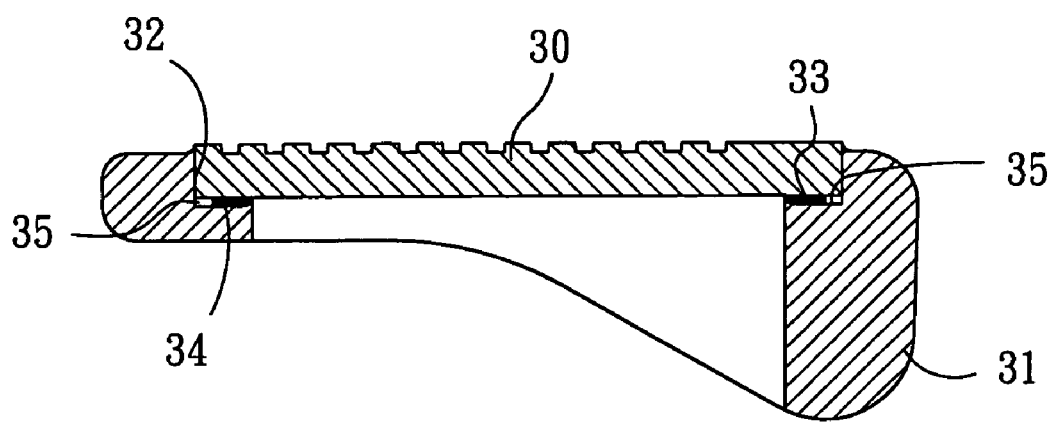
FIG. 3 is a sectional view of still another conventional golf club head.

Before the present invention is described in greater detail, it should be noted that same reference numerals have been used to denote like elements throughout the specification.

Figure 4:
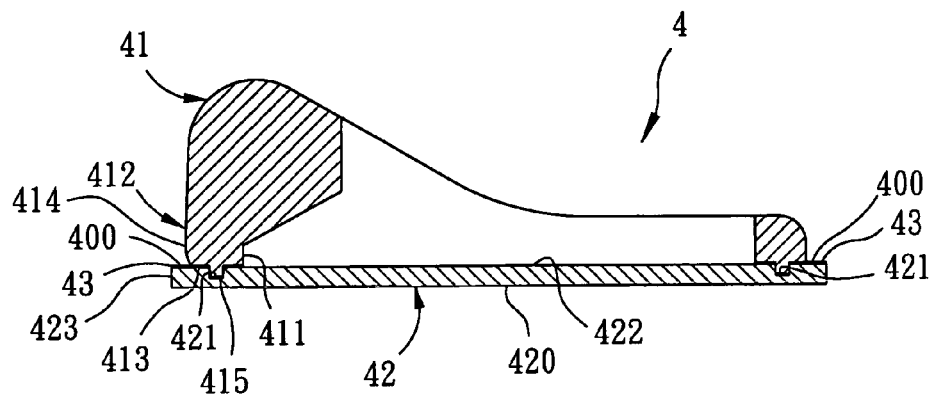
FIG. 4 is a sectional view of a golf club head embodying the present invention.
Figure 5:
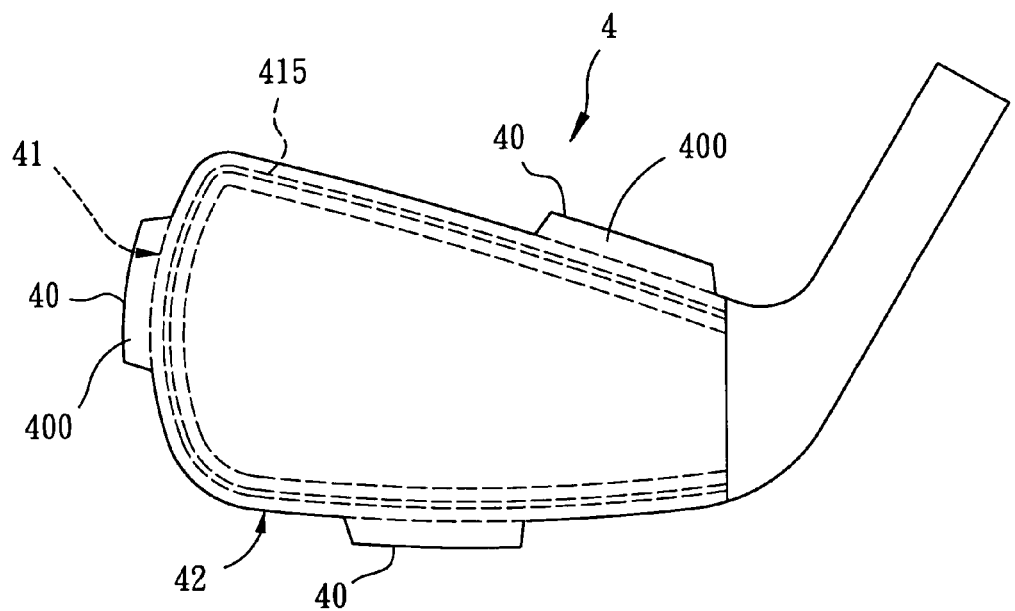
FIG. 5 is a front view of the golf club head of FIG. 4.

Referring to FIGS. 4 and 5, a golf club head embodying the present invention is shown at 4 and includes a metal casing 41 and a striking plate 42 which are brazed to each other. A layer of brazing material 43 is formed between the welded surfaces of the casing 41 and the striking plate 42. The casing 41, the striking plate 42 and the brazing material 43 are made of different metals, and the melting point of the brazing material 43 is lower than those of the casing 41 and the striking plate 42.

The casing 41 has a front open end 412 which defines an opening 411. The front open end 412 has a frontmost end face 413 and a first outer peripheral face 414 extending rearwardly from the frontmost end face 413.

The striking plate 42 has a front surface 420, a rear surface 422, and a second outer peripheral face 423 which extends forwardly from the rear surface 422 to the front surface 420. The striking plate 42 covers the opening 411 of the casing 41, and the rear surface 422 is placed over the frontmost end face 413 of the casing 41. The rear surface 422 interlocks with the frontmost end face 413 of the casing 41 through interlocking elements provided therebetween. In this embodiment, the interlocking elements include a projection 415 which projects forwardly from the frontmost end face 413 and a groove 421 formed in the rear surface 422. The layer of brazing material 43 is formed between the rear surface 422 of the striking plate 42 and the frontmost end face 413 of the casing 41.

The striking plate 42 further has a plurality of extension parts 40 which project outward in a direction away from the opening 411 and along the plane of the layer of brazing material 43. Each extension part 40 extends beyond the first outer peripheral face 414 of the casing 41 and forms a shoulder 400 with the first outer peripheral face 414.

Figure 6:
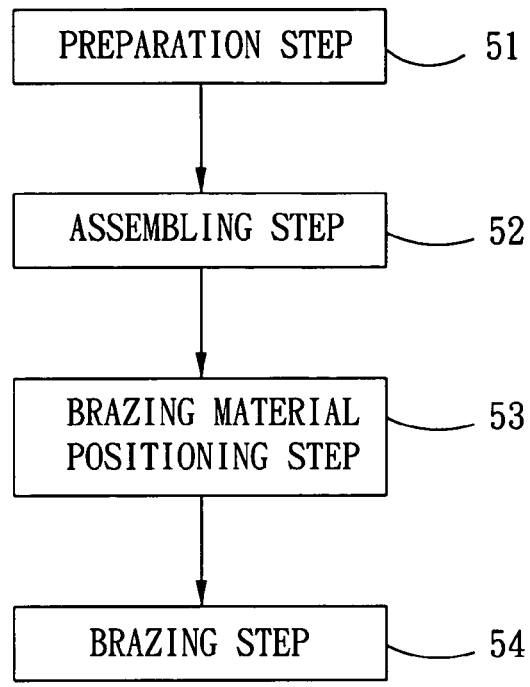
FIG. 6 is a block diagram illustrating a first preferred embodiment of the method according to the present invention.
Figure 7:
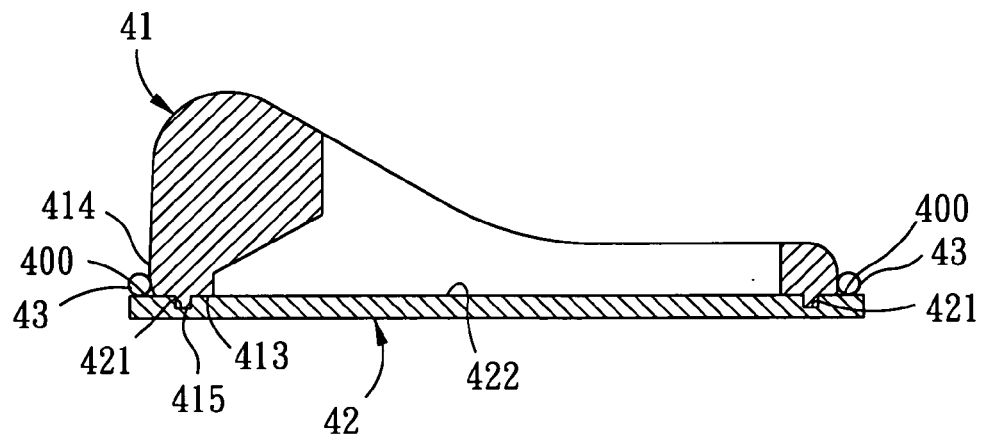
FIG. 7 is a sectional view illustrating how a brazing material is positioned in the first preferred embodiment.

Referring to FIGS. 6 and 7, a first preferred embodiment of the method according to the present invention is illustrated as including a preparation step 51, an assembling step 52, a brazing material positioning step 53, and a brazing step 54. The first preferred embodiment is conducted to produce the golf club head 4.

The preparation step 51 includes the forming of the casing 41, the striking plate 42, and a plurality of pieces of the brazing materials 43.

In the assembling step 52, the casing 41 and the striking plate 42 are brought together by contacting the rear surface 422 of the striking plate 42 with the frontmost end face 413 of the casing 41 and by engaging the projection 415 of the frontmost end face 413 with the groove 421 of the striking plate 42. A clearance is formed between the rear surface 422 and the frontmost end face 413. Shoulders 400 are formed around the first outer peripheral face 414. The shoulders 400 are exterior to and are connected to the clearance between the rear surface 422 and the frontmost end face 413.

In the brazing material positioning step 53, pieces of the brazing material 43 are seated respectively against the shoulders 400 which are parts of the rear surface 422 of the striking plate 42. The brazing material 43 is therefore positioned outwardly of the opening 411 and externally of the clearance between the rear surface 422 and the frontmost end face 413 and is immediately adjacent the clearance.

In the brazing process 54, the casing 41 and the striking plate 42 which have been brought together are placed in a high temperature environment. The high temperature environment may be an oven which is provided with a vacuum pressure or filled with an inert gas. In this embodiment, a vacuumed oven is used. Since the melting point of the brazing material 43 is lower than the melting points of the casing 41 and the striking plate 42, only the brazing material 43 melts in the oven. The melt of the brazing material 43 flows from the shoulder 400 into the clearance between the rear surface 422 and the frontmost end face 413 through a capillary action. When the brazing material 43 is cooled, it is bonded to the rear surface 422 and the frontmost end face 413, thereby interconnecting the striking plate 42 and the casing 41.

Figure 8:
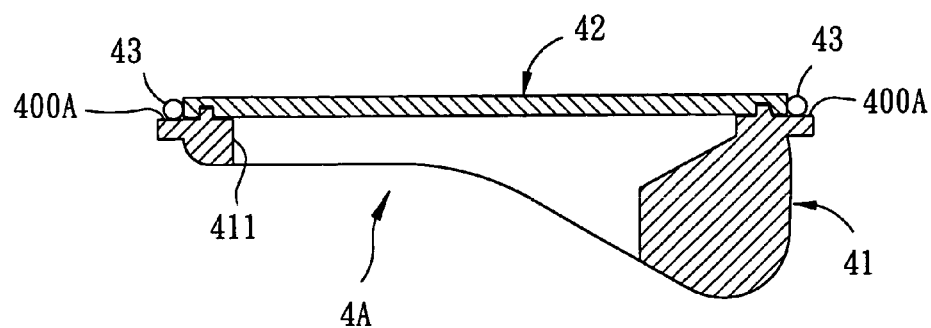
FIG. 8 is a sectional view illustrating how a brazing material is positioned in a second preferred embodiment of the method according to the present invention.
Figure 9:
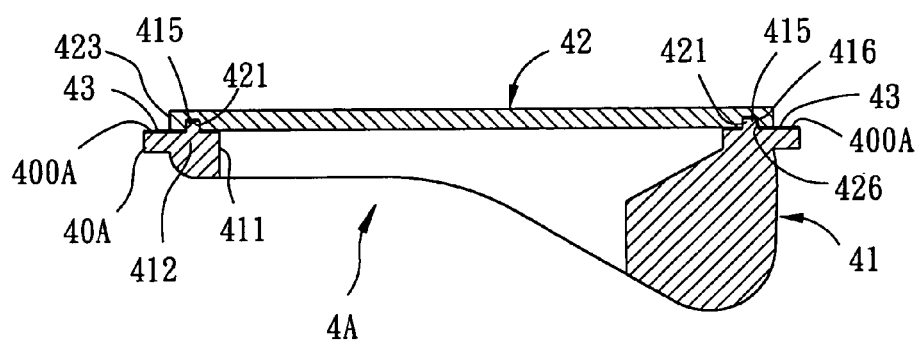
FIG. 9 is a sectional view of a golf club head produced by the method of the second embodiment.
Figure 10:
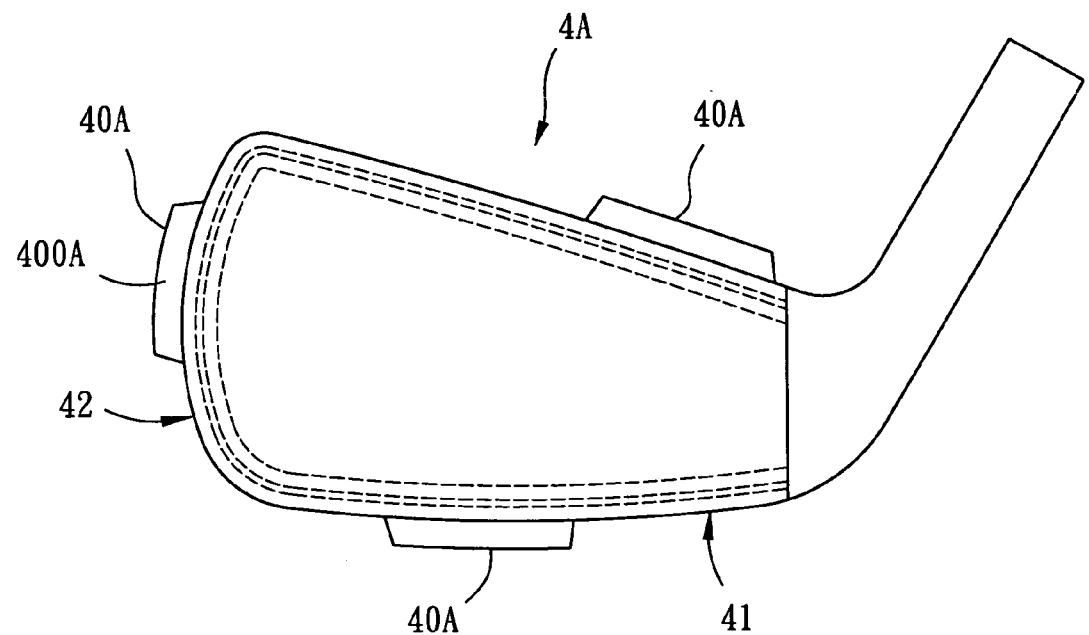
FIG. 10 is a front view of the golf club head shown in FIG. 9.

Referring to FIGS. 8, 9 and 10 in combination with FIG. 6, a second preferred embodiment of the method according to the present invention is used to produce a golf club head 4A. This embodiment is generally similar to the first preferred embodiment. However, in this embodiment, extension parts 40A are formed integrally with the casing 41, unlike the extension part 40 provided in the first embodiment. Each extension part 40A extends outwardly from the front open end 412 of the casing 41 in a direction away from the opening 411 and forms a shoulder 400A with the second outer peripheral face 423 of the striking plate 42. The shoulder 400A is a part of the frontmost end face 413 of the casing 41. During the step of positioning the brazing material 43, the brazing material 43 is seated against the shoulder 400A as shown in FIG. 8. As the shoulder 400A are formed outwardly of the opening 411, the brazing material is positioned at the outer side of the opening 411 and at the exterior of the clearance between the rear surface 422 and the frontmost end face 413 during the manufacturing process. Furthermore, the projection 415 formed on the front open end 412 of the casing 41 is provided with a slanting face 416 and the groove 421 is provided with a slanting face 426 so as to increase the areas of the contact surfaces of the striking plate 41 and the front open end 412 of the casing 41.

Due to the provision of the shoulders 400, 400A which are formed outwardly of the opening 411 of the casing 41, the brazing material 43 can be positioned easily and accurately on the shoulders 400, 400A during the manufacturing of the golf club head 4, 4A. In addition, since the brazing material 43 is positioned on the shoulders 400, 400A rather than between the striking plate 42 and the front open end 412 of the casing 41, positional deviation occurring during the manufacturing process can be prevented and the rate of good quality products can be increased.

Besides, the increased contact surface areas between the striking plate 42 and the casing 41 provide more surface area to which the brazing material 43 can be adhered, thereby increasing the bonding surface area between the striking plate 42 and the casing 41.

On the other hand, since the brazing material 43 is introduced into the clearance between the striking plate 42 and the casing 41 through a capillary action in the present invention and since the clearance permits only a small amount of brazing material 43 to flow thereinto, the brazing material 43 forms only a thin film layer between the striking plate 42 and the casing 41, thus providing stable and firm bonding between the striking plate 42 and the casing 41.

Furthermore, as the brazing material flows into the clearance between the striking plate 42 and the casing 41 from the outside of the clearance, the problem associated with the conventional manufacturing method in which the brazing material overflows to the exterior surface of the golf club head can be eliminated. According to the present invention, the amount of the brazing material 43 which is suitable for bonding the striking plate 42 and the casing 41 may be predetermined so that the brazing material 43 not only is sufficient to bind the striking plate 42 and the casing 41 but also leaves only a small amount of residue on the shoulder 400, 400A. As such, subsequent processing steps, such as grinding and polishing steps, for removal of the residue can be dispensed with.

Moreover, if there are voids between the contact surfaces of the casing 41 and the striking plate 42, the brazing material 43 may be supplemented by placing an additional amount of the brazing material 43 on the shoulders 400, 400A followed by heating so that the brazing material 43 flows into the voids. Therefore, the present invention enhances the rate of quality products and is advantageous in solving the problem of poor bonding between the striking plate 42 and the casing 41 due to the insufficient amount of brazing material 43.

Figure 11:
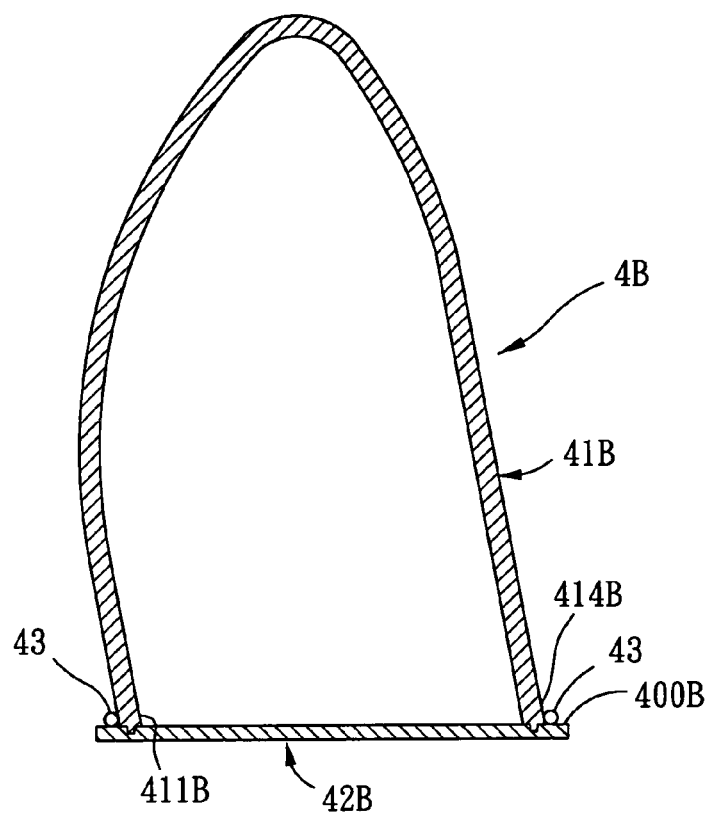
FIG. 11 is a sectional view illustrating how the brazing material is positioned in a third preferred embodiment of the method according to the present invention.
Figure 12:
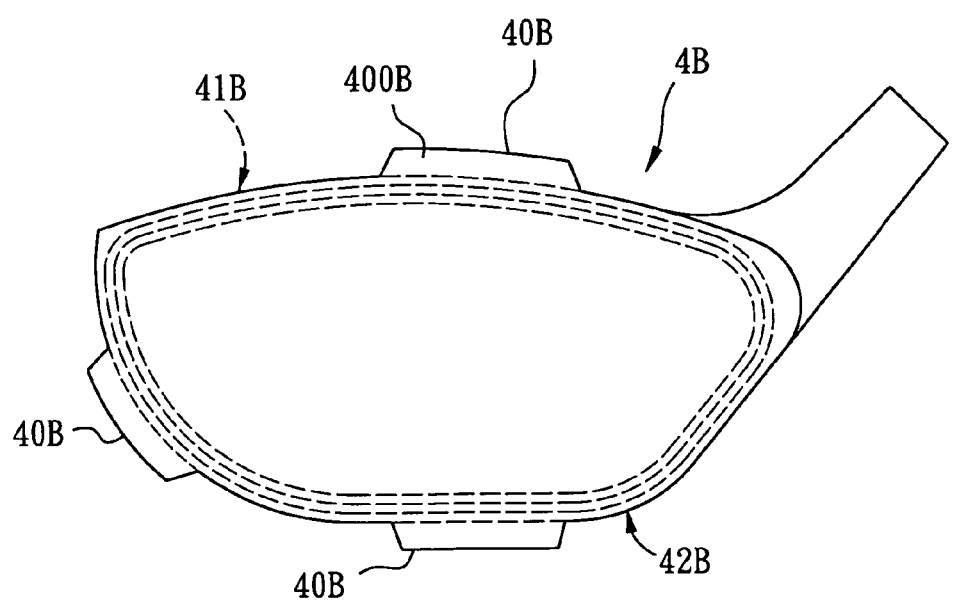
FIG. 12 is a front view of the golf club head produced by the third embodiment.

FIGS. 11 and 12 show a golf club head 4B to be coupled with a wooden shaft which is made by a third preferred embodiment of the method according to the present invention. The golf club head 4B has extension parts 40B extending outwardly from the striking plate 42B in a direction away from the opening 411B of the casing 41B. The extension parts 40B form shoulders 400B with an outer peripheral face 414B of the casing 41B. In this embodiment, the brazing material 43 is seated against the shoulders 400B.

Figure 13:
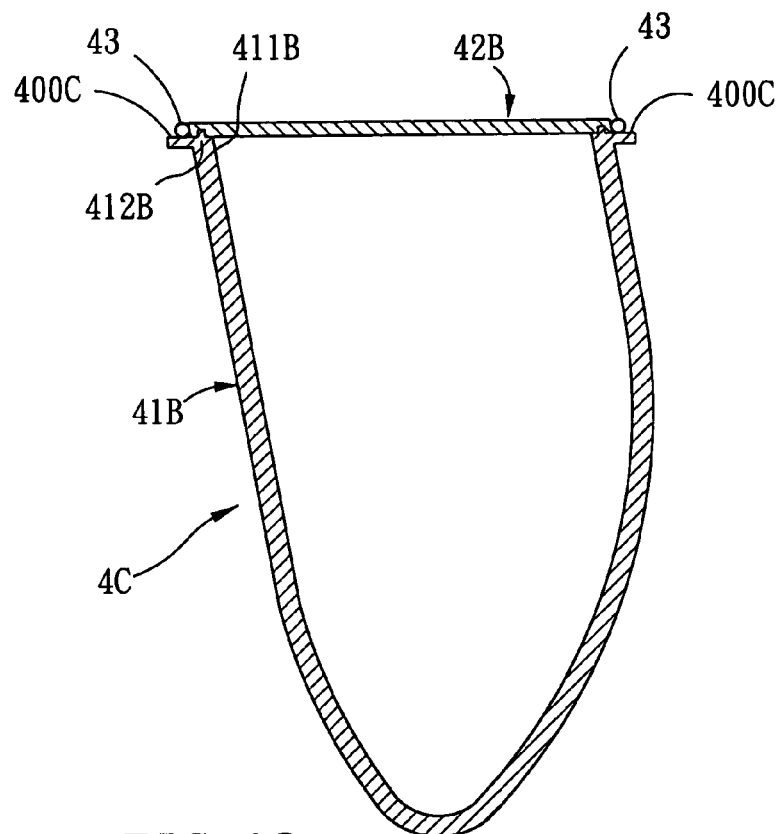
FIG. 13 is a sectional view illustrating how the brazing material is positioned in a fourth preferred embodiment of the method according to the present invention.
Figure 14:
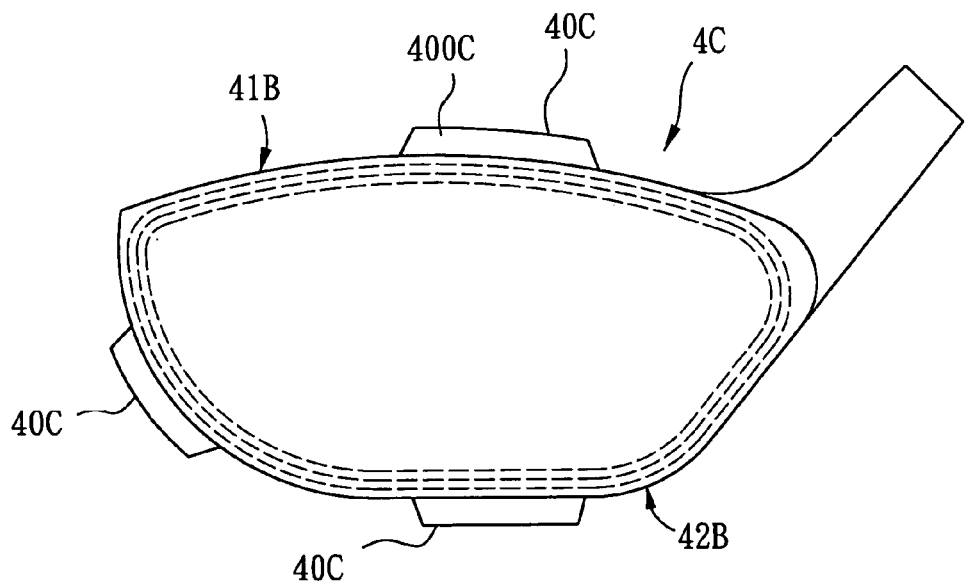
FIG. 14 is a front view of the golf club head produced by the fourth embodiment.

FIGS. 13 and 14 show a golf club head 4C to be coupled with a wooden shaft which is made by a fourth preferred embodiment of the method according to the present invention. The golf club head 4C has extension parts 40C extending outwardly from the front open end 412B in a direction away from the opening 411B of the casing 41B. The extension parts 40C form shoulders 400C with the casing 41B. In this embodiment, the brazing material 43 is seated against the shoulders 400C.

Figure 15:
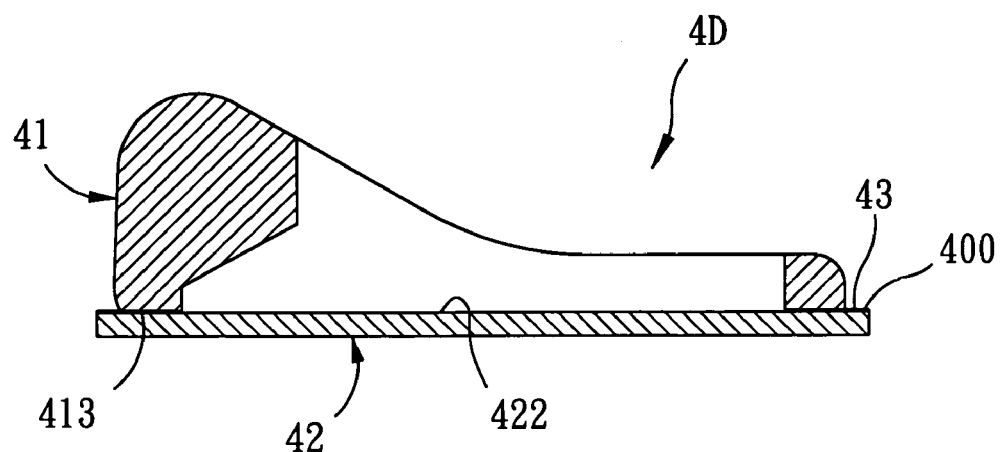
FIG. 15 is a sectional view of another golf club head produced by the first preferred embodiment.

FIG. 15 shows another golf club head 4D which is made by the first embodiment of the method of the present invention. The golf club head 4D differs from the golf club head 4 shown in FIG. 4 only in that no projection and groove are provided on the rear surface 422 of the striking plate 42 and the frontmost end face 413 of the casing 41.

Figure 16:
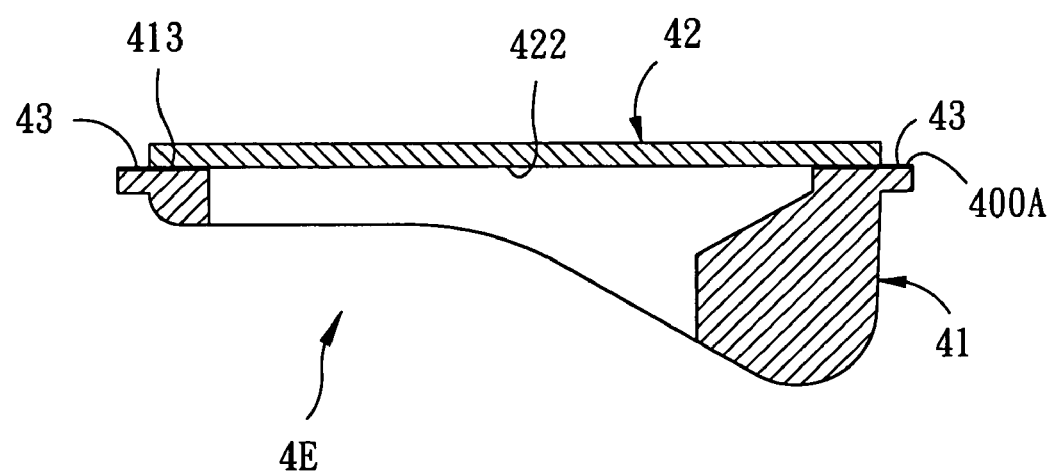
FIG. 16 is a sectional view of another golf club head produced by the second preferred embodiment.

FIG. 16 shows another golf club head 4E which is made by the method of the second preferred embodiment. The golf club head 4E differs from the golf club head 4A shown in FIG. 9 only in that no projection and groove are provided on the rear surface 422 of the striking plate 42 and the frontmost end face 413 of the casing 41.

Figure 17:
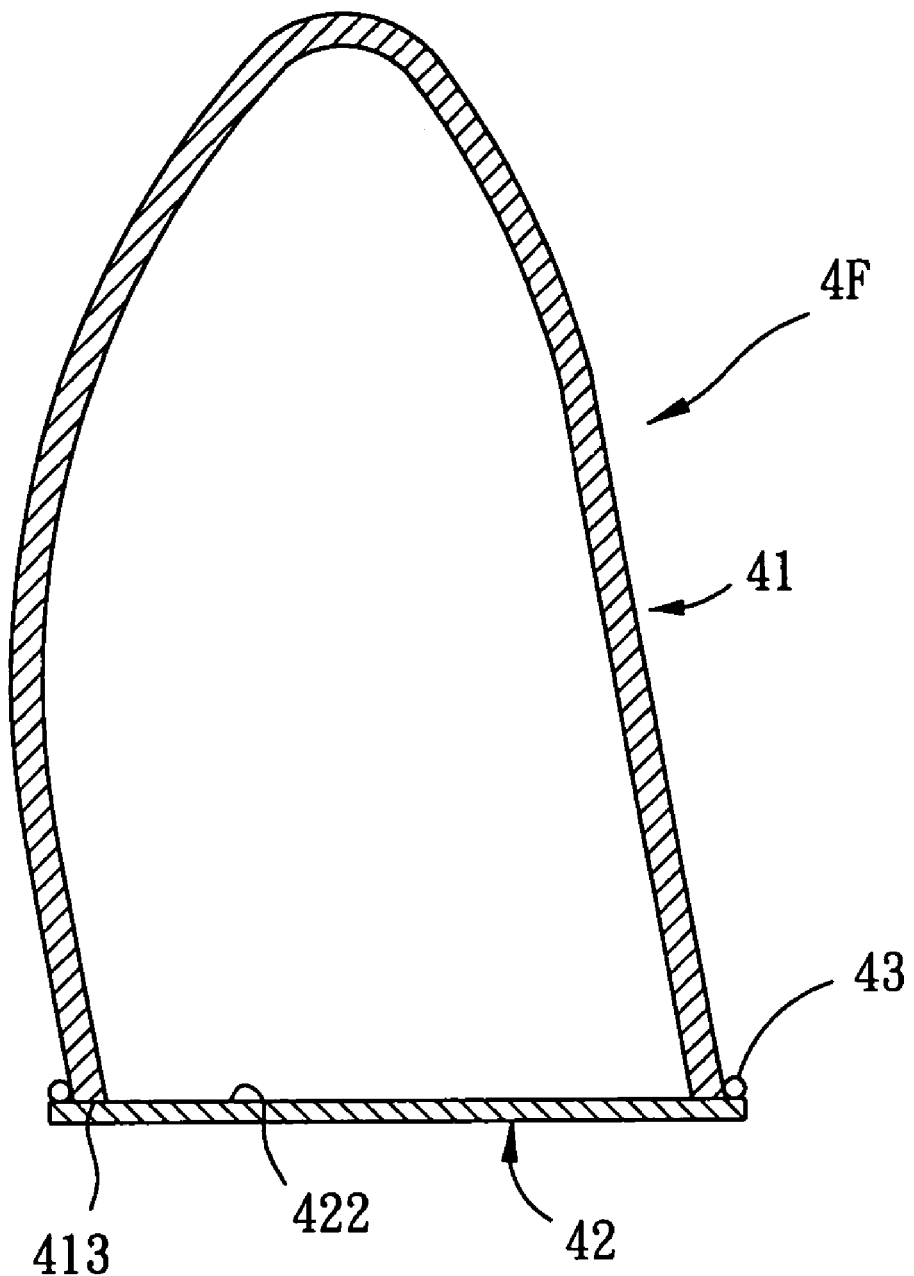
FIG. 17 is a sectional view of another golf club head produced by the third preferred embodiment.

FIG. 17 shows another golf club head 4F which is made by the method of the third preferred embodiment. The golf club head 4F differs from the golf club head 4B shown in FIG. 11 only in that no projection and groove are provided on the rear surface 422 of the striking plate 42 and the frontmost end face 413 of the casing 41.

Figure 18:
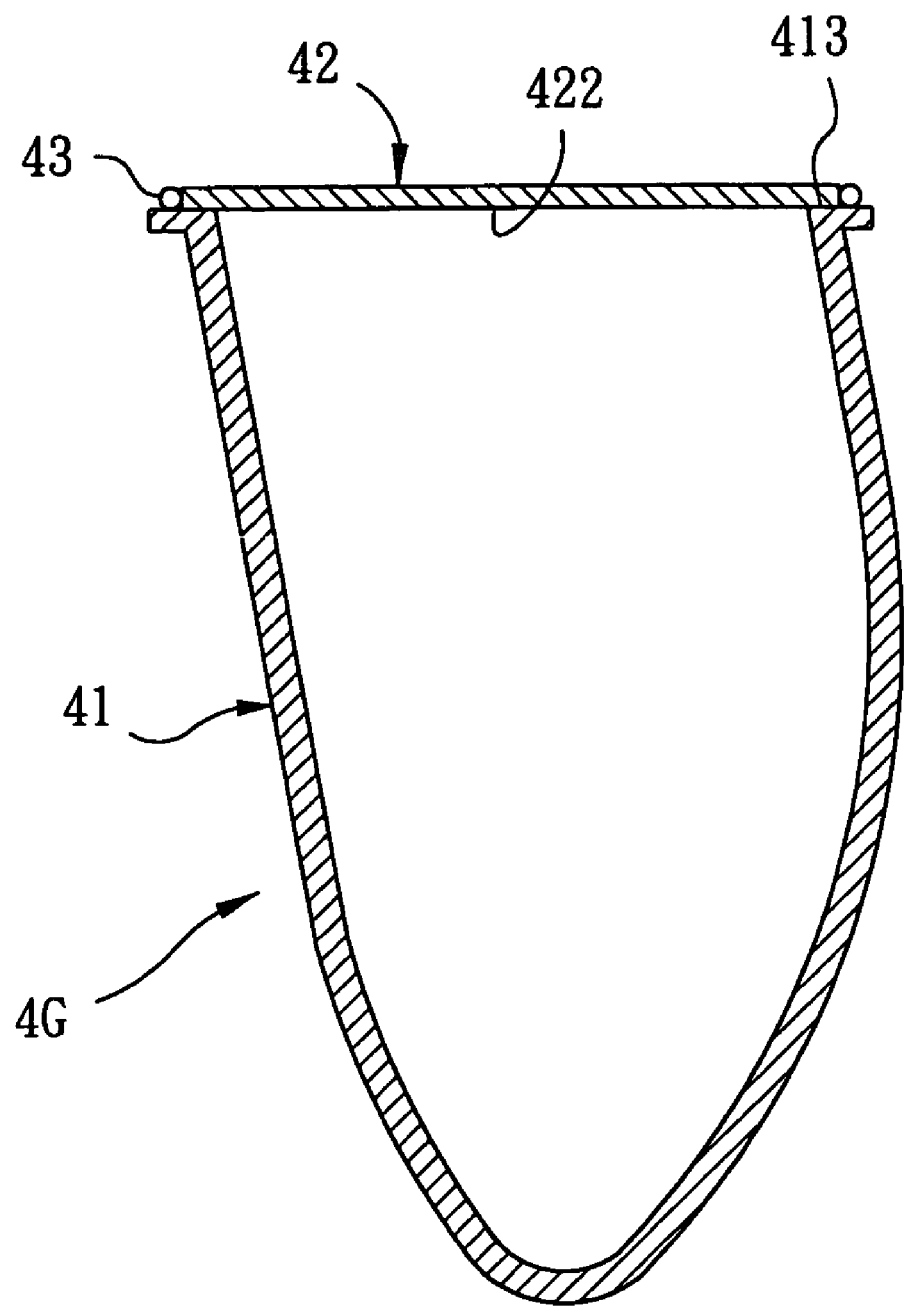
FIG. 18 is a sectional view of another golf club head produced by the fourth preferred embodiment.

FIG. 18 shows another golf club head 4G which is made by the method of the fourth preferred embodiment. The golf club head 4G differs from the golf club head 4C shown in FIG. 13 only in that no projection and groove are provided on the rear surface 422 of the striking plate 42 and the frontmost end face 413 of the casing 41.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

We claim:

1. A method of making a golf club head, comprising:

preparing a metal body including a front open end which defines an opening;

preparing a striking plate having a rear surface to be bonded to said front open end of the metal body, one of said front open end of the body and said rear surface of the striking plate providing at least one extension lug, said extension lug located on a section of one of said front open end of the body and said rear surface of the striking plate, said extension lug being protruded to be exposed on an outer circumference of the body;

connecting said striking plate with said front open end by contacting said rear surface with said front open end, thereby creating a clearance between said rear surface and said front open end and around said opening, said clearance having at least one clearance section adjacent said extension lug;

positioning a brazing material on said extension lug provided on one of said rear surface and said front open end and immediately adjacent said clearance section; and causing said brazing material to melt and to flow into said clearance section through a capillary action, thereby forming a layer of said brazing material between said rear surface and said front open end.

2. The method as claimed in claim 1, wherein said brazing material is positioned by being seated against one of said rear surface and said front open end externally of said opening.

3. The method as claimed in claim 2, further comprising the step of adding said brazing material to said clearance when the amount of said brazing material in said clearance is insufficient, wherein an additional amount of said brazing material is positioned on one of said rear surface and said front open end externally of said clearance and is heated to flow into said clearance by a capillary action.

4. The method as claimed in claim 1, wherein said brazing material has a melting point which is lower than the melting points of said striking plate and said body.

5. The method as claimed in claim 1, wherein said extension lug extends outwardly from said front open end of the body in a direction away from the opening.

6. The method as claimed in claim 5, wherein said extension lug forms a shoulder with an outer peripheral face of the body.

7. The method as claimed in claim 1, wherein said extension lug extends outwardly from said rear surface of the striking plate in a direction away from the opening of the body.

8. The method as claimed in claim 7, wherein said extension lug forms a shoulder with an outer peripheral face of the striking plate.

* * * * *